United States Patent [19]

Edging et al.

[11] 3,954,939

[45] May 4, 1976

[54] METHOD FOR PREPARING MONOCALCIUM PHOSPHATE COMPOSITIONS WITH REDUCED CAKING TENDENCIES

[75] Inventors: Thomas E. Edging; Robert E. Benjamin, both of Nashville, Tenn.; Wayne J. Balfanz, New City, N.Y.

[73] Assignee: Stauffer Chemical Company, Westport, Conn.

[22] Filed: May 21, 1974

[21] Appl. No.: 471,924

[52] U.S. Cl.................................. 423/311; 423/267
[51] Int. Cl.² .................... C01B 15/16; C01B 25/26
[58] Field of Search ............ 423/308–313, 307, 267

[56] References Cited
UNITED STATES PATENTS

| | | | |
|---|---|---|---|
| 2,012,436 | 8/1935 | Saklatwalla et al................. | 423/311 |
| 3,469,938 | 9/1969 | McLeod et al. ..................... | 423/315 |
| 3,672,826 | 6/1972 | Hornig et al........................ | 423/315 |

*Primary Examiner*—Oscar R. Vertiz
*Assistant Examiner*—Gregory A. Heller
*Attorney, Agent, or Firm*—Daniel S. Ortiz

[57] ABSTRACT

A method for preparing a hydrated monocalcium phosphate, with reduced caking tendencies and quick carbon dioxide release, from a monocalcium phosphate composition having a loss on ignition between about 14 and less than 17% by admixing water with the monocalcium phosphate and permitting the water and monocalcium phosphate to remain in contact for a sufficient length of time to form a hydrated monocalcium phosphate composition having a loss on ignition between 17 and 21.5%. The product is dried to a free moisture content of less than about 1% if the free moisture content is above this level.

14 Claims, 1 Drawing Figure

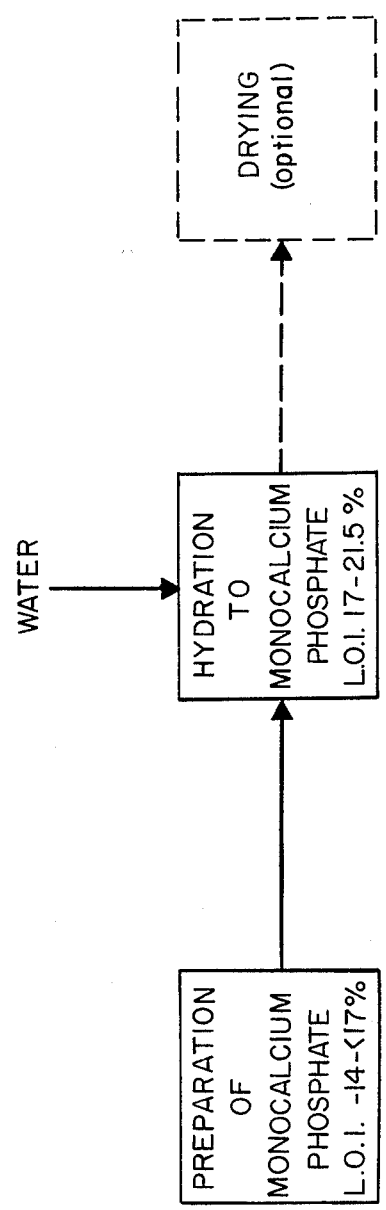

3,954,939

METHOD FOR PREPARING MONOCALCIUM PHOSPHATE COMPOSITIONS WITH REDUCED CAKING TENDENCIES

BACKGROUND OF THE INVENTION

Anhydrous monocalcium phosphate is a well known composition useful as a baking acid in applications where a delayed or secondary release of carbon dioxide is required. Anhydrous monocalcium phosphate has a theoretical loss on ignition at 800°C. of 15.4 percent. Commercially available anhydrous monocalcium phosphate usually has a loss on ignition at 800°C. between about 14 and about 15.5%.

Monocalcium phosphate monohydrate is a well known composition useful as a baking acid in baking powders and self rising flour compositions. The material is particularly useful in that it provides a relatively fast release of carbon dioxide during the baking process. Monocalcium phosphate monohydrate has a loss on ignition of 20.5%. Commercially prepared material usually has a loss on ignition between about 20.0 to about 21.5%.

Although the product, monocalcium phosphate monohydrate has been used extensively, the material is known to cake badly on storage. It is the custom to introduce additives into the product to prevent lumps from forming in bags on storage or on exposure to a humid atmosphere. Conditioning agents as disclosed in U.S. Pat. Nos. 1,913,796, 3,244,478, 3,273,960 and 3,678,883 have been developed to prevent caking of the monocalcium phosphate monohydrate during storage.

Another method employed to improve the caking tendencies and flow properties of monocalcium phosphate monohydrate involves milling of the wet crystals before drying. The process improves the properties of the composition, but requires careful control and is a high maintenance process with a low onstream factor.

It is an object of the present invention to provide a method for preparing a hydrated monocalcium phosphate composition with reduced caking tendencies. It is a further object of the present invention to provide a method for preparing a hydrated monocalcium phosphate composition having reduced caking tendencies without the addition of additives. Another object of the present invention is to provide a monocalcium phosphate composition with reduced caking tendencies which has the quick carbon dioxide release characteristics of monocalcium phosphate monohydrate.

BRIEF SUMMARY OF THE INVENTION

According to the present invention, hydrated monocalcium phosphate compositions having reduced caking tendencies are prepared by admixing water with a monocalcium phosphate composition having a loss on ignition between about 14 and less than 17%, permitting the water and monocalcium phosphate to remain in contact for a sufficient length of time to form a hydrated monocalcium phosphate composition with a loss on ignition between 17 and 21.5%, and drying the monocalcium phosphate composition to a free moisture content below 1% and preferably below about 0.5% if the admixture has a free moisture content above this level.

DESCRIPTION OF THE DRAWINGS

The FIGURE is a diagrammatic representation of the process for preparing hydrated monocalcium phosphate compositions.

DETAILED DESCRIPTION OF THE INVENTION

As shown in the drawing, the process comprises providing a monocalcium phosphate composition having a loss on ignition between 14 and less that 17% and preferably between about 15, and about 16.5%, admixing water with the monocalcium phosphate and permitting the water to remain in contact with the monocalcium phosphate to form a composition having a loss on ignition between 17 and 21.5% and preferably 18.7 to 20.5%, and if necessary, drying the material at a temperature in the range of about 55° to about 95°C. to reduce the free moisture content to less than about 1% and preferably less than about 0.5%. The process can be carried out in several treatment zones or by sequential operation carried out in one zone.

As noted herein, percent loss-on-ignition refers to the loss in weight if a sample, which has been dried at 75°C. for one hour, upon heating at 800°C. for 1 hour, divided by the weight of the original sample after drying at 75°C., multiplied by 100. The percent free water is the loss in weight of a sample on drying at 75°C. for 1 hour divided by the initial weight of the sample, multiplied by 100. The particular ranges of percent loss on ignition and percent free water are critical to the reduced caking tendencies of the product of the invention.

Monocalcium phosphate compositions having a loss on ignition between 14 and less than 17% can be prepared by methods known in the art. U.S. Pat. No. 2,160,700 discloses that anhydrous monocalcium phosphate can be prepared by crystallization from an acid solution. A preferred method of preparing crystalline anhydrous monocalcium phosphate is also disclosed in U.S. Pat. No. 2,160,700. In the method a slight excess of lime is added to a relatively concentrated phosphoric acid solution to spontaneously produce a reaction temperature in excess of 140°C. The temperature is controlled in a range above 140°C. but below a temperature at which substantial amounts of pyrophosphate form. The temperature is usually controlled by the rate of lime addition. The reaction is continued until a substantially dry mass of solid anhydrous monocalcium phosphate is produced.

Monocalcium phosphate compositions having a loss on ignition between 14 and less than 17% can also be prepared by preparing monocalcium phosphate monohydrate by the evaporation of water from a solution of monocalcium phosphate, by spray drying a solution or slurry of monocalcium phosphate or by crystallization from solution. The monocalcium phosphate monohydrate prepared by the above methods usually has a percent loss-on-ignition of from about 20 to 21.5%. The monocalcium phosphate monohydrate is then heated at a temperature above about 95°C. but below the temperature at which substantial amounts of pyrophosphate form for a sufficient length of time to provide a monocalcium phosphate composition with a loss-on-ignition between 14 and less than 17% and preferably between about 15 and 16.5%. The monocalcium phosphate monohydrate is preferably heated at a temperature in the range of about 110° to about 180°C. and most preferably at about 130° to about 160°C. until a composition having the required loss-on-ignition is formed.

Methods for preparing a monocalcium phosphate composition having a percent loss-on-ignition between about 14 and less than 17% are well understood by those skilled in the art. Monocalcium phosphate is prepared according to the following reaction:

$$CaO + 2H_3PO_4 \rightarrow Ca(H_2PO_4)_2 + H_2O$$

Monocalcium phosphate prepared by commercial processes usually contains small amounts of dicalcium phosphate. The commercial product can be advantageously hydrated by the present process.

Water is admixed with the monocalcium phosphate composition and permitted to remain in contact with the composition for a sufficient length of time to permit the percent loss-on-ignition to increase to between 17 and 21.5%. At low temperatures, that is, in the range of about ambient temperature to about 40°C., the rate of hydration if relatively slow. It is preferred to contact the water with the anhydrous monocalcium phosphate at a temperature between about 40° and about 95°C., and most preferably between about 50° and about 85°C. At the lower temperatures, reaction between the water and the monocalcium phosphate occurs, but the rate is relatively slow and extended periods of contact may be required. At temperatures above about 95°C., the vapor pressure of water is high and monocalcium phosphate monohydrate tends to revert to the anhydrous form. Therefore, it is preferred to contact the monocalcium phosphate composition with water at a temperature between about 40° and about 95°C. Higher temperatures can be utilized if the hydration is done at an elevated pressure.

The time necessary for the monocalcium phosphate composition having a loss-on-ignition from 17 to 21.5% to form by the contact of water with the monocalcium phosphate composition with a loss-on-ignition between 14 and less than 17% is not only dependent upon the temperature but also on the initial loss-on-ignition of the composition.

Generally at the higher temperatures contact times as short as 2 minutes can provide a suitable composition. At room temperature contact time as long as 4 days may be required. In the preferred temperature range contact times from about 3 minutes to about 1 hour are required to provide a suitable composition.

The water is introduced directly into the composition, and distributed relatively evenly throughout the composition. The water can be added directly to the hot material or it can be admixed with a cold composition. It is preferable to admix the water with a composition at a temperature between about 50°C. and 180°C. and most preferably with a composition at a temperature between 75° and 140°C. Hot or cold water can be admixed with the composition. Water at ambient temperature is usually admixed with the composition at the higher temperature in the range.

The water reacts with the substantially anhydrous material to form a monocalcium phosphate composition having a loss-on-ignition between 17 and 21.5%. The amount of water introduced into the monocalcium phosphate composition with a loss-on-ignition between 14 and less than 17% is calculated to be sufficient to increase the loss-on-ignition of the composition to between 17 and 21.5%. Allowance is usually made for water lost in reducing the temperature of a hot composition and for water lost as vapor in the air with which the composition may be contacted. A large excess of water above that required to bring the loss-on-ignition into the required range should not be utilized since the free water content of the final product must be brought to less than 1%.

It is usually not possible to completely react all of the water introduced into the composition. A portion of the water usually remains uncombined in the form of free water. Free water is measured by drying the monocalcium phosphate at 75°C. for 1 hour. The weight loss on drying at 75°C. for 1 hour divided by the initial weight multiplied by 100 is noted as the percent free water.

The percent free water must be below 1% and preferably below 0.5%. The percent free water which can be tolerated in the monocalcium phosphate composition and still provide a material having substantially reduced caking tendencies is dependent upon the percent loss-on-ignition of the finished product. At a loss-on-ignition in the range of 19% to 20%, a free moisture content of up to 1% can be tolerated, and still provide a material having reduced caking tendencies. At a loss-on-ignition of 17 to 19% and 20 to 21.5%, the free moisture content must be below about 0.5% to provide a material having substantially reduced caking tendencies. All percentages and parts used herein are by weight unless otherwise noted.

The monocalcuim phosphate composition while in contact with the water may develope some lightly agglomerated lumps which can be readily broken up by mild agitation, mixing or other means for breaking up lightly agglomerated materials. Once the agglomerates have been eliminated from the composition, the composition shows substantially reduced tendency for caking.

Water can be introduced into the monocalcium phosphate composition having a loss-on-ignition from 14 to less than 17% by means suitable for evenly dispersing a liquid throughout a mass of solid materials. Liquid-solid mixing apparatus, such as pug mills, zig zag blenders, ribbon mixers, rotating drums having spray means and Kneadermaster are suitable for admixing the water with the monocalcium phosphate composition.

The material can also be hydrated by contact with water in a fluid bed. The bed can be agitated by a warm steam-air mixture. The preferred method is to introduce liquid water directly into an agitated bed of material.

The invention will be illustrated by reference to the following examples which clearly point out the critical parameters and the advantages of the process provided by the present invention.

EXAMPLE 1

Preparation of Monocalcium Phosphate Composition With a Loss on Ignition between 14 and less than 17 Percent.

To 5 parts by weight of $P_2O_5$ as 80 percent food grade phosphoric acid at 100°C. in a reaction vessel are added 2 parts CaO as lime with agitation. The lime is added at a rapid rate until the temperature of the mixture reaches 160°C. The rate of lime addition is then controlled to maintain the temperature of the reaction mixture between 150°C. and 180°C. until all the lime has been added. The heat of reaction vaporizes the water associated with the phosphoric acid and the water formed by the reaction. A dry, free flowing essentially anhydrous calcium phosphate with a L.O.I. at 800°C. of 15.7 percent is produced.

EXAMPLE 2

A monocalcium phosphate composition with a loss on ignition of 15.5% was prepared according to the method shown in Example 1. The material was permitted to cool to 107°C. Three parts by weight water were sprayed onto an agitated bed of 25 parts by weight of the monocalcium phosphate composition over a period of 12 minutes. Agitation was continued for an additional 18 minutes after the water had been added to the agitated bed of material. Samples were taken at 9 minutes, 15 minutes and 30 minutes and the temperature of the bed was monitored during the period. Results of the test are shown in Table 1.

room temperature water were added to the rotating V blender over a period of 20 minutes. The amount of water was varied to give a range of loss on ignition in the product of from 15.8 to 20.3%.

After water was added, the contents were allowed to mix with the intensifier bar on for 5 additional minutes. The blender was then opened and any wall scale broken up. After breaking up the scale, the contents were mixed for an additional 5 minutes.

The temperature of the contents of the V blender increased during the addition of water due to the heat of hydration. In run 3, the final temperature of the mixture was 68°C. The final temperature of the mixture in run 4 was 82°C. The loss on ignition, free moisture, baking rate and a compaction test were conducted on the final compositions. In addition material from run 4 and 5 were dried to a free moisture content of 0.1%.

TABLE 1

| Time Min. | Parts Water Added | Bed Temp. °C. | % LOI | % Free Moist. | Bake Rate (cc. of $CO_2$) | | | | Neut. Valve |
|---|---|---|---|---|---|---|---|---|---|
| | | | | | 1 min. | 2 min. | 3 min. | 4 min. | |
| 0 | — | 107 | 15.5 | — | — | — | — | — | — |
| 6 | 1.5 | 95 | — | — | — | — | — | — | — |
| 9 | 2.25 | 88 | 18.9 | 1.2 | 122 | 122 | 132 | 139 | — |
| End of Spray: | | | | | | | | | |
| 12 | 3.0 | 84 | — | — | — | — | — | — | — |
| 15 | — | 78 | 20.2 | 1.7 | 131 | 131 | 135 | 138 | — |
| 30 | — | — | 20.1 | 1.0 | 136 | 136 | 138 | 140 | 83.6 |

The bake rate was determined by the amount of carbon dioxide liberated as a function of time from the addition of 0.7 grams of the monocalcium phosphate composition to 10 cc. of a solution of sodium bicarbonate containing sufficient sodium bicarbonate to liberate 200 cc. of carbon dioxide.

The neutralization value was determined by suspending 840 milligrams of material in 24 milliliters of cold water. The mixture was stirred and 90 milliliters of 0.1N sodium hydroxide were added to the mixture. The mixture was brought of boiling in exactly 2 minutes and boiled for one minute. The hot mixture was then titrated to a phenothalein end point with 0.2N hydrochloric acid. The neutralization value was calculated as parts of $NaHCO_3$ equivalent to 100 parts of sample.

The procedure indicates that the rate of hydration of monocalcium phosphate in the presence of water is rapid at elevated temperatures. The example shows that the hydrated monocalcium phosphate composition has the rapid carbon dioxide release characteristics of monocalcium phosphate monohydrate. The product had substantially reduced caking tendencies.

EXAMPLE 3

Hydration in a Patterson-Kelly Twin Shell Blender

A Patterson-Kelly 8 quart V twin shell blender with an insulated shell, equipped with a standard liquid dispersion ring and intensifier bar were used in the experiments. For each run, 14 pounds of a monocalcium phosphate composition with a loss on ignition of 15.6%, prepared according to the process of Example 1 was introduced into the Patterson-Kelly 8 quart V blender at a temperature of 25°C. Varying amounts of The results of the test are shown in Table 2.

The baking rate was measured by the donut method. The donut method consists of carefully blending 1.07 gm. of sample with 0.75 gm of baking soda and 73.5 gm. donut flour. Then the mixture is placed in a closed agitated vessel and 43 cc. of water at 27°C. is quickly added. The evolution of $CO_2$ which is given off when the baking acid and soda react is recorded as a function of time.

In commercial monocalcium phosphate monohydrate, a 10 minute baking rate of 120 to 136 cc. of $CO_2$ is acceptable.

Caking under compaction was determined by placing two pound portions of the through 140 mesh fraction of the product in multiwall, moisture barrier bags, sealing the bags and placing a weight on the bags equivalent to the weight of three tiers of pallets. After 26 days, the bags were opened and the degree of caking was evaluated. The condition of the material after the compaction test is shown in Table 2.

The removal of free moisture down to 0.1% produced a monocalcium phosphate composition which showed no evidence of caking. This is an outstanding result for this type of material.

Run R-5 indicates that a composition with loss on ignition of 20.3% and a free water content of 1% caked badly, however, when the free water content was reduced to 0.1% the composition performed outstandingly in the compaction test. However, Runs R-3 and R-4 show that when the composition has a loss on ignition of 18.6% or 19.1%, a free water content of 0.8 and 0.7% is not deleterious to the caking properties of the composition.

Table II

PHYSICAL AND BAKING PROPERTIES OF MONOCALCIUM PHOSPHATE AS A FUNCTION OF THE DEGREE OF HYDRATION

|  | Feed | R-1 | R-2 | R-3 | R-4 | R-5 | R-4 Dryed at 75°C. | R-5 Dryed at 75°C. |
|---|---|---|---|---|---|---|---|---|
| Feed (lbs.) |  | 14 | 14 | 14 | 14 | 14 |  |  |
| Water (lbs.) |  | 0.25 | 0.5 |  | 0.82 | 1.16 |  |  |
| % LOI of Product | 15.6 | 15.8 | 16.7 | 18.6 | 19.1 | 20.3 | 18.9 | 20.2 |
| % Free Water | .2 | .7 | .8 | .7 | .8 | 1.0 | .1 | .1 |
| % Free Acid | .2 | .04 | .05 | .05 | .02 | .05 | .01 |  |
| Screen Analysis |  |  |  |  |  |  |  |  |
| % on 60 |  | 4.1 | 8.3 |  | 8.9 | 11.6 |  |  |
| % −60 +80 |  | 1.2 | 1.6 |  | 2.0 | 2.4 |  |  |
| % −80 +100 |  | 1.7 | 1.9 |  | 1.5 | 2.5 |  |  |
| % −100 +140 |  |  | 3.6 |  | 3.7 | 4.6 |  |  |
| % −140 +200 |  | 11.4 | 8.3 |  | 8.8 | 10.6 |  |  |
| % thru 200 | 80 | 82.0 | 77.0 |  | 75.6 | 69.0 |  |  |
| Baking Rate (Donut Method) |  |  |  |  |  |  |  |  |
| 2 min (cc of $CO_2$) | 102 | 112 | 124 | 129 | 127 | 126 | 121 | 128 |
| 10 min (cc of $CO_2$) | 150 | 146 | 148 | 145 | 145 | 143 | 142 | 143 |
| Bag Compaction Test (26 days) |  |  |  |  |  |  |  |  |
| Flowability from Bag |  | had to break up | had to shake bag | free flowing | free flowing | had to break up | free flowing | free flowing |
| Wgt. % lumps (on 20 mesh) |  | 16 | 7 | 0.5 | 2.5 | 42 | none | none |
| Hardness of lumps |  | medium | soft | soft | soft | medium | — | — |

EXAMPLE 4

Rate of Hydration in Relation to Temperature.

A series of tests were conducted to determine the effect of temperature on rate of hydration. A monocalcium phosphate composition was prepared according to the process described in Example 1. Ten pound portions of the composition, with a bulk density of 70 pounds per cubic foot were introduced into an insulated Patterson-Kelly 8 quart V blender equipped with an intensifier bar and water addition ring. The monocalcium phosphate composition was preheated in an oven to the run temperature before each run. The water was added in 2 or 3 minutes, followed by a 1 minute post mix. The material was sampled and the intensifier bar and tumbling action were continued for an additional 10 minutes. Through this period the walls of the V blender were lightly tapped to prevent buildup of wall scale. Further hydration, as a function of time was evaluated by holding the material in a tray, in an oven at 80°C. or at room temperature. The trays contained about 2 inches of material and were covered but not sealed. The results of the tests are shown in Table 3.

Table 3 indicates that the rate of hydration is rapid at temperatures above about 50°C. The table also indicates that the addition of water substantially decreases the temperature of the material if the temperature of the starting material is above about 90°C. The table also shows that the hydration rate is relatively slow when a material is maintained at room temperature.

The Table also shows that the process is effective for feed materials having a loss on ignition between about 15 and 16.5 percent.

TABLE III

Part A — Rate of Hydration

| Run No. | Feed lbs. | Feed LOI % | Temp. °C. | c.c. Added | Water Temp. °C. | Time to add (min.) | After 1 min. Post Mix Temp. °C. | After 1 min. Post Mix %F.M. | After 1 min. Post Mix LOI[2] | After 1 min. Post Mix B.D. lbs./ft.[3] | After 10 min. More Mixing Temp. °C. | After 10 min. More Mixing % F.M. | After 10 min. More Mixing LOI[2] | After 10 min. More Mixing B.D. lbs./ft.[3] |
|---|---|---|---|---|---|---|---|---|---|---|---|---|---|---|
| 6 | 10 | 15.1 | 96 | 450 | 54 | 2½ | 68 | 4.5 | 17.4 | 50 | 62 | 3.4 | 18.4 | 58 |
| 7 | 10 | 15.1 | 125 | 450 | 53 | 2½ | 85 | 4.1 | 17.0 | 47 | 75 | 2.6 | 18.2 | 59 |
| 8 | 10 | 15.8 | 86 | 450 | 46 | 3 | 83 | 2.8 | 18.8 | 53 | 74 | 2.4 | 18.8 | 59 |
| 9 | 10 | 16.4 | 60 | 350 | 56 | 2½ | 58 | 4.9 | 18.4 | 48 | 55 | 3.4 | 19.6 | 59 |
| 10 | 10 | 15.5 | 51 | 450 | 59 | 2¾ | 69 | 5.0 | 17.0 | 38 | 62 | 4.6 | 17.5 | 45 |
| 11A | 10 | 15.5 | 22 | 300 | 20 | 2 | 38 | 4.7 | 16.1 | 38 | 43 | 3.3 | 17.2 | 51 |
| 11B | 10 | 15.5 | 22 | 400 | 20 | 2½ | 54 | 5.4 | 16.4 | 36 | 51 | 3.9 | 17.6 | 45 |
| 11C | 10 | 15.5 | 22 | 500 | 20 | 3 | 53 | 6.1 | 16.8 | 37 | 57 | 5.5 | 17.4 | 47 |

[1] Continued on Table III — Part B
[2] Loss on Ignition after first pre-drying at 75°C.

Part B[4]

| Run No. | After 20 Min. Hold Temp. °C. | After 20 Min. Hold % FM | After 20 Min. Hold LOI[2] −FM | After 50 Min. Hold Temp. °C. | After 50 Min. Hold % FM | After 50 Min. Hold LOI[2] | After 80 Min. Hold Temp. °C. | After 80 Min. Hold % FM | After 80 Min. Hold LOI[2] | After 110 Min. Hold Temp. °C. | After 110 Min. Hold % FM | After 110 Min. Hold LOI[2] | After 230 Min. Hold Temp. °C. | After 230 Min. Hold % FM | After 230 Min. Hold LOI[2] | After 24 hours % FM | After 24 hours LOI[2] | After 48 hours % LOI | After 2 Weeks % LOI[3] |
|---|---|---|---|---|---|---|---|---|---|---|---|---|---|---|---|---|---|---|---|
| 7 | 65 | 2.8 | 19.1 | 67 | 2.2 | 19.3 | 74 | 1.6 | 19.5 | 77 | 1.5 | 19.5 | 80 | .6 | 19.5 |  |  |  |  |
| 9 | 72 | 2.0 | 18.5 | 75 | 1.8 | 18.8 | 72 | 1.5 | 19.1 | 72 | 1.2 | 19.4 | 72 | .5 | 19.2 |  |  |  |  |
| 10 | 76 | 1.6 | 20.1 | 78 | 1.2 | 20.2 | 80 | 1.1 | 20.4 | 80 | 0.7 | 20.5 | 80 | 0.3 | 20.3 |  |  |  |  |
| 8 | 57 | 3.4 | 19.4 | 69 | 2.5 | 19.7 | 75 | 2.0 | 19.9 | 80 | 1.2 | 20.2 | 80 | .7 | 20.1 |  |  |  |  |
| 11 | 72 | 3.9 | 17.4 | 78 | 4.1 | 17.4 | 80 | 4.1 | 17.3 | 80 | 3.9 | 17.3 | 80 | .9 | 17.8 | .1 | 17.6 |  |  |
| 6A |  |  |  | 27 | 3.0 | 17.4 |  |  |  | 22 | 2.4 | 17.9 | 22 | 2.7 | 17.7 | 1.9 | 17.7 | 1.5 18.4 | 1.2 18.4 |
| 6B |  |  |  | 27 | 3.5 | 17.9 |  |  |  | 22 | 3.1 | 17.9 | 22 | 3.5 | 17.4 | 2.8 | 18.0 | 2.0 18.3 | 1.2 18.4 |
| 6C |  |  |  | 27 | 5.3 | 17.3 |  |  |  | 22 | 4.8 | 17.5 | 22 | 5.0 | 17.3 | 4.2 | 17.4 | 4.7 17.4 | 1.4 18.2 |

[3] Stored at room temperature, covered, but not sealed material about 2" deep in pan.
[4] Continued from Table VI — Part A

What is claimed is:

1. A method for preparing a hydrated form of monocalcium phosphate with reduced caking tendencies which comprises intimately admixing water with a monocalcium phosphate composition having a loss on ignition at 800°C. from about 14 to less than 16.5% by weight, said water provided in an amount sufficient to increase the loss on ignition to from 17 to 21.5% by weight; permitting the water and monocalcium phosphate to remain in contact for a sufficient length of time to hydrate the monocalcium phosphate composition to a loss on ignition from 17 to 21.5% by weight and removing any free water in excess of 1%.

2. The process of claim 1 wherein the monocalcium phosphate composition has a loss on ignition at 800°C. of from 15 to 16.5%.

3. The process of claim 1 wherein the hydrated monocalcium phosphate having a loss on ignition of from 17 to 21.5% by weight is dried to a free water content of less than 0.5%.

4. The process of claim 2 wherein the free water is removed from the hydrated monocalcium phosphate having a loss on ignition from 17 to 21.5% by weight to less than about 0.5%.

5. The process of claim 1 wherein the water and monocalcium phosphate mixture is maintained at a temperature between about 40 and about 95°C.

6. The process of claim 5 wherein the admixture is maintained at from about 50°C. to about 85°C.

7. The process of claim 1 wherein water is sprayed into an agitated bed of the monocalcium phosphate composition.

8. The process of claim 1 wherein the water is intermixed with steam.

9. The process of claim 1 wherein the water is introduced into a fluid bed of the monocalcium phosphate composition agitated by means of a steam air mixture.

10. The process of claim 1 wherein the monocalcium phosphate composition with a loss on ignition of from about 14 to less than 16.5 percent is at a temperature between about 50°C. and 180°C. when the water is intimately admixed with the composition.

11. The process of claim 10 wherein the water is at ambient temperatures.

12. A process for preparing a hydrated monocalcium phosphate composition with reduced caking tendencies which comprises:
   a. forming a reaction mixture which achieves a spontaneous temperature above about 140°C. by introducing lime into aqueous phosphoric acid said lime provided in an amount sufficient to provide about one mole of CaO to two mols of phosphoric acid and said phosphoric acid provided at a concentration and temperature such that the heat of reaction is sufficient to substantially vaporize the water of reaction and the water associated with the reactants;
   b. maintaining the reaction mixture at a temperature between about 140° and about 180°C. whereby a monocalcium phosphate composition with a loss on ignition between about 14 and less than 17% by weight is formed;
   c. admixing water with the monocalcium phosphate composition with a loss on ignition between about 14 and less than 17% by weight said water provided in an amount sufficient to increase the loss on ignition to from 17 to 21.5%;
   d. permitting the water to remain in contact with the monocalcium phosphate composition for a sufficient length of time to form a hydrated composition with a loss on ignition from 17 to 21.5% by weight containing free water.

13. The process of claim 12 wherein the composition is dried to reduce the amount of free water to less than one percent.

14. The process of claim 12 wherein the free water is reduced to less than about 0.5 percent.

* * * * *